United States Patent [19]

Korsky et al.

[11] Patent Number: 4,679,228
[45] Date of Patent: Jul. 7, 1987

[54] SPEAKERPHONE SENSING CIRCUIT

[75] Inventors: Vincent V. Korsky, Shelton; Ronald M. Keenan, Woodbury, both of Conn.

[73] Assignee: Tie/Communications, Inc., Shelton, Conn.

[21] Appl. No.: 717,688

[22] Filed: Mar. 29, 1985

[51] Int. Cl.$^4$ ............................................. H04M 3/22
[52] U.S. Cl. ..................................... 379/165; 379/388
[58] Field of Search ............... 179/100 L, 99 R, 99 A, 179/81 R, 81 B, 18 AD; 379/156, 157, 167, 243, 387, 388, 27, 165

[56] References Cited

U.S. PATENT DOCUMENTS 4,196,316  4/1980  McEowen et al. ............. 179/18 ES
4,456,793  6/1984  Baker et al. ..................... 179/99 R

FOREIGN PATENT DOCUMENTS 0164363  9/1983  Japan ................................. 179/99 R Primary Examiner—Gene Z. Rubinson
Assistant Examiner—R. Vaas
Attorney, Agent, or Firm—Kenyon & Kenyon

[57] ABSTRACT

An apparatus for indicating to a central service unit of a telephone system having a central service unit coupled to a plurality of station sets whether a particular station set comprises a speakerphone and the type of speakerphone from among two types of speakerphone, is disclosed. The station set includes a microprocessor controller having an input line coupled to a selected one of a low or high logic level. The input line is connected to an electronic switch which receives interrogation signals from the central service unit. Depending on the logic level to which the input line is coupled and the state of the switch, the central service unit can determine whether the station set comprises a speakerphone and the type of speakerphone.

6 Claims, 4 Drawing Figures

U.S. Patent     Jul. 7, 1987     4,679,228
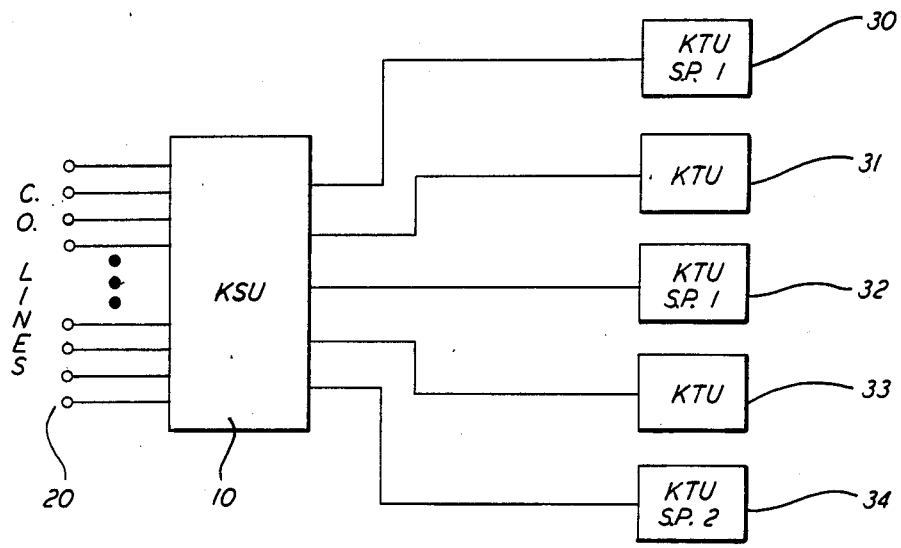
FIG. 1
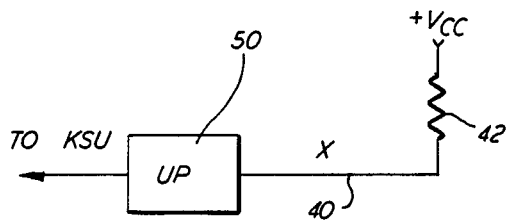
FIG. 2     NON-SPEAKER PHONE
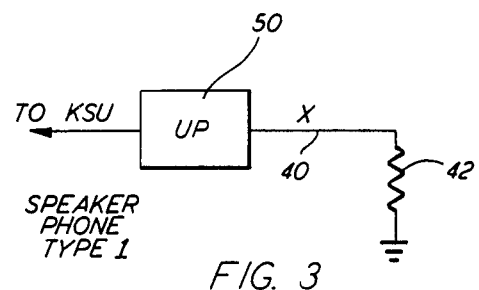
FIG. 3     SPEAKER PHONE TYPE 1
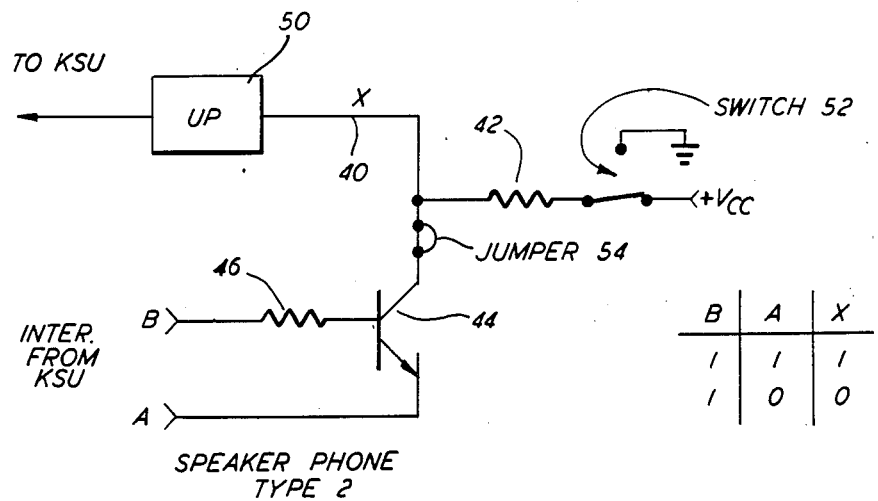
SPEAKER PHONE TYPE 2
FIG. 4

0;
SPEAKERPHONE SENSING CIRCUIT

BACKGROUND OF THE INVENTION

The present invention relates to a circuit which can be provided in a speakerphone, coupled, for example, in a telephone system, for enabling a central controlling device, for example, a key service unit of a key telephone system, to determine whether a speakerphone is connected into the system. This is necessary so that the central processor in the key service unit can transmit the necessary commands to the speakerphone to control, for example, gain levels of the output signal from the microphone of the speakerphone or the input signals to the loudspeaker of the speakerphone.

SUMMARY OF THE INVENTION

It is an object of the present invention to provide circuitry in a speakerphone for enabling a central telephone service unit to determine whether a speakerphone is connected into the system.

It is a further object of the present invention to enable a central telephone service unit to determine, from among more than one type of speakerphone, the type of speakerphone that is connected into the system.

These and other objects of the present invention are achieved by apparatus for enabling a central service unit of a telephone system, the system including the central service unit and a plurality of station sets, to determine whether a station set of the system comprises a speakerphone and whether the speakerphone is of a first or second type comprising first control means having an input line coupled via resistor means to a selected one of a high or low logic level, and switch means coupled between the input line and a first interrogation line for receiving a first signal from the central service unit and having a control input for controlling the state of the switch means and for receiving a second interrogation signal from the central service unit, the state of the switch means and the selected one of the logic levels to which the input line is coupled indicating to the control means whether the station set include a speakerphone and the type of the speakerphone, the control means including means for transmitting the indication to the central service unit.

BRIEF DESCRIPTION OF THE DRAWINGS

The invention will be described in greater detail in the following detailed description with reference to the drawings in which:

FIG. 1 is block diagram of a key telephone system for illustrating the general principles of the present invention;

FIG. 2 is a block diagram of circuitry contained in a telephone station set of a key telephone system which indicates to the key service unit that the station set is not a speakerphone;

FIG. 3 is a block diagram of circuitry contained in a key station set which indicates to the key service unit that a speakerphone of a first type is provided in the station set; and FIG. 4 is a block diagram of circuitry contained in a station set which indicates to a key service unit that a speakerphone of a second type is contained within the station set.

DETAILED DESCRIPTION

With reference now to the drawings, FIG. 1 shows the overall block diagram of a key telephone system for example, a TIE 612 Key Telephone System available from TIE/communications, Inc., of Shelton, Conn. A key service unit (KSU) 10 coupled to central office (C.O.) telephone lines 20 controls a plurality of key telephone units (KTU's) 30 through 34. The key telephone units may be of a variety of types. Each key telephone unit may be exactly the same as the other unit but may be provided with different options. For example, the key telephone units 30 to 34 may be provided with or without speakerphones or may be provided with speakerphones of varying types. For example, illustratively, key telephone units 30 and 32 each contain a speakerphone of a first type and key telephone unit 34 contains a speakerphone of a second type. Key telephone units 31 and 33 do not contain speakerphones. The speakerphone types may be determined, for example, by the amount of gain provided in the speakerphone. For example, a speakerphone of one type may have an increased gain because it is coupled to a long communications loop, and a speakerphone of a second type may have a reduced gain because it is coupled to a short communication loop. Also, the signalling protocols between the KTU and the KSU may vary depending upon the speakerphone type, for example. Accordingly, it is necessary for the KSU to be able to determine not only if a speakerphone is connected into the system, but the type of the speakerphone.

FIG. 2 shows a block diagram of the circuitry provided in a KTU which does not include a speakerphone. A line 40 is connected to a microprocessor 50 contained in the KTU, which may be the local microprocessor of the KTU provided for controlling KTU functions, for example, speakerphone functions. As shown, line 40 is connected through a resistor 42 to a positive source of voltage. The high logic level of line 40 thus informs the local microprocessor 50 that the speakerphone option is not provided in the KTU. This signal is transmitted by the microprocessor 50 to the KSU microprocessor at the appropriate time, informing the KSU that that particular key telephone unit is not provided with a speakerphone.

FIG. 3 shows the circuitry provided for indicating to the KSU that the KTU includes a speakerphone of a first type. Line 40 to microprocessor 50 is coupled to ground via resistor 42. The low logic level on line 40 indicates to microprocessor 50 that the speakerphone is of a first type. This signal is transmitted to the system KSU.

FIG. 4 shows the circuitry provided for indicating that a second type of speakerphone is provided in the KTU. As shown, line 40 is coupled via resistor 42 to a source of positive voltage. Additionally, the collector of a transistor 44 is connected to line 40. The emitter of the transistor is connected to a first interrogation line A and the base of the transistor is connected through a resistor 46 to a second interrogation line B. Signals are received on these interrogation lines from the KSU, for example, through the bus interconnecting the KSU and a particular KTU, for example, which may be a multiplex bus. As shown in the logic table contained within FIG. 4, if both interrogation signals A and B are at a logic 1 level, the signal X on line 40 will also be at a logic 1 level because transistor 44 is in a nonconducting state. If interrogation signal B is at a logic 1 level and interrogation signal A is at a logic 0 level, transistor 44 will be in a conducting state and the signal X on line 40 will be at a logic 0 level. The change in the signal on line 40 from a logic 1 state to a logic 0 state depending upon the polling interrogation signals A and B from the KSU informs microprocessor 50 that the speakerphone is of type 2. Signals relayed by microprocessor 50 to the KSU microprocessor inform the KSU microprocessor that a type 2 speakerphone is contained within that particular KTU.

In a telephone system having both type 1 and type 2 speakerphones, polling signals will be transmitted to station sets having a type 1 speakerphone as well as to those station sets which do not have a speakerphone. The lack of a response to those polling signals, i.e., the failure of line 40 to change state in response to the signals, indicates that the station set does not contain a type 2 speakerphone, but that either a type 1 speakerphone is provided, or no speakerphone, as indicated by the status of line 40.

One variation of the present invention which would allow the described circuitry of FIG. 4 to be provided in all station sets is the following. Resistor 42 may be coupled via a double throw switch 52 to either a high logic level or to a low logic level. A jumper 54 can then be provided betwen the collector of transistor 44 and line 40. If the jumper is removed and resistor 42 is coupled to a high logic level, the station set does not include a speakerphone. If resistor 42 is coupled to a low logic level, the station set comprises a type 1 speakerphone. If the jumper is in place and the resistor 42 coupled to a high logic level and input line 40 responds to the interrogation signals as shown in the logic table of FIG. 4, the station set comprises a speakerphone of type 2.

In the foregoing specification, the invention has been described with reference to specific exemplary embodiments thereof. It will, however, be evident that various modifications and changes may be made thereunto without departing from the broader spirit and scope of the invention as set forth in the appended claims. The specification and drawings are, accordingly, to be regarded in an illustrative rather than a restrictive sense.

What is claimed is:

1. Apparatus for enabling a central service unit of a telephone system, the system including a central service unit and a plurality of station sets, to determine whether a station set of the system contains a speakerphone and whether the speakerphone is a first or second type comprising:

first control means having an input line coupled via resistor means to a selected one of a high or low logic level; and switch means coupled between said input line and a first interrogation line for receiving a first signal from the central service unit and having a control input which receives a second interrogation signal from the central service unit, said second interrogation signal controlling the state of the switch means, the state of the switch means and the selected one of the logic levels to which the input line is coupled indicating to the control means whether the station set includes a speakerphone and the type of speakerphone, said control means including means for transmitting said indication to the central service unit.

2. The apparatus recited in claim 1, wherein, if said input line is connected to a high logic level and said switch means is disconnected from said input line, said station set does not comprise a speakerphone.

3. The apparatus recited in claim 1, wherein, if said input line is connected to said low logic level, said station set comprises a first type of speakerphone.

4. The apparatus recited in claim 1, wherein, if said input line is coupled to a high logic level and said input line maintains a high logic level if both said interrogation signals are at a high logic level and said input line maintains a low logic level if said first interrogation line is at a low logic level and said second interrogation line is at said high logic level, said station set comprises a second type of speakerphone.

5. The apparatus recited in claim 1, wherein said switch means comprises a transistor.

6. The apparatus recited in claim 1, wherein said control means comprises a microprocessor.

* * * * *